United States Patent
Calce et al.

(10) Patent No.: US 7,398,238 B1
(45) Date of Patent: Jul. 8, 2008

(54) SYSTEM FOR SAVINGS AND TAX MANAGEMENT OF GRATUITY INCOME

(75) Inventors: John Calce, Dallas, TX (US); Bret Madole, Plano, TX (US); Richard Ellman, Dallas, TX (US); Robert Elliot, Frisco, TX (US)

(73) Assignee: Vizor Group, Inc., Dallas, TX (US)

( * ) Notice: Subject to any disclaimer, the term of this patent is extended or adjusted under 35 U.S.C. 154(b) by 1131 days.

(21) Appl. No.: 10/194,850

(22) Filed: Jul. 12, 2002

Related U.S. Application Data

(63) Continuation-in-part of application No. 09/711,577, filed on Nov. 13, 2000.

(51) Int. Cl.
*G06Q 40/00* (2006.01)
(52) U.S. Cl. ............................................. 705/35
(58) Field of Classification Search ................... 705/30, 705/35
See application file for complete search history.

(56) References Cited

U.S. PATENT DOCUMENTS

| | | | | |
|---|---|---|---|---|
| 5,850,077 A | * | 12/1998 | Tognazzini | 235/380 |
| 5,933,812 A | * | 8/1999 | Meyer et al. | 705/15 |
| 5,943,655 A | * | 8/1999 | Jacobson | 705/30 |
| 6,041,313 A | * | 3/2000 | Gilbert et al. | 705/36 R |
| 6,401,079 B1 | * | 6/2002 | Kahn et al. | 705/30 |
| 6,591,281 B1 | * | 7/2003 | Kawasaki | 708/110 |
| 6,848,613 B2 | * | 2/2005 | Nielsen et al. | 235/379 |
| 2001/0014873 A1 | * | 8/2001 | Henderson et al. | 705/35 |

* cited by examiner

*Primary Examiner*—Jim Trammell
*Assistant Examiner*—Hai Tran
(74) *Attorney, Agent, or Firm*—Anderson, Levine & Lintel, LLP

(57) ABSTRACT

An investment system provides for multiple employers. The employers withhold payments to employees according to preferences defined by the employee. The employer forwards the withholding to an investment account manager who manages accounts for each employee. The account manager pools the withholding from the employees and invests the money in proportion to the preferences stated by the employees in the plan. Employees may change employers without affecting their accounts. Tax information may be calculated by the system to ensure accurate gratuity accounting and tax compliance on the part of the employer.

12 Claims, 6 Drawing Sheets

37 →

PERSONAL INFO
Name: John Smith            Addr1: 789 Elm St.
SSN: 012 34 5678            Addr2:
DOB: 5/5/72                 City: Dallas   State: Texas

---

WITHHOLDING INFORMATION

38 →

| Daily    | $0-100   | $5  |
|----------|----------|-----|
| Daily    | $100-200 | 10% |
| Daily    | >$200    | 15% |
| Monthly  | >$2000   | 15% |

---

DISTRIBUTION OF WITHHOLDING

39 →

| Daily     | 50% | IRA         | up to $2000 per year  |
|-----------|-----|-------------|------------------------|
| Daily     | 25% | Savings     | up to $200 per month  |
| Daily     | 25% | Credit Card | up to $100 per month  |
| Remainder |     | Checking    |                        |

*Fig. 2b*

SYSTEM FOR SAVINGS AND TAX MANAGEMENT OF GRATUITY INCOME

CROSS-REFERENCE TO RELATED APPLICATIONS

This application is a continuation-in-part of U.S. Ser. No. 09/711,577, filed Nov. 13, 2000, entitled "Employee Investment System" to Calce et al.

STATEMENT OF FEDERALLY SPONSORED RESEARCH OR DEVELOPMENT

Not Applicable

BACKGROUND OF THE INVENTION

1. Technical Field

This invention relates in general to financial systems and, more particularly, to a financial system for low-wage or transitory workers.

2. Description of the Related Art

Every wage earner has a need to invest at least a portion of his or her earnings. Many workers are able to invest money in a retirement plan and/or other investment vehicles. Retirement plans provide at least two significant benefits to participants. First, for people who have trouble saving money, a retirement plan can take an agreed upon amount from the participant's paycheck, thereby automatically providing discipline. Second, even for people who are diligent savers, money can be invested in stocks and bonds that historically have a greater rate of appreciation than simple interest provided by a savings account or certificate of deposit.

Nonetheless, many employers do not provide investment options to their employees. This is particularly true for certain categories of workers, particularly low-wage or transitory workers. Restaurant employees are typical of this worker category, although other groups, such as hotel workers and salespeople, would fall into this category as well, since a large percentage of their earnings come from gratuities/commissions, rather than wages, and because they switch jobs frequently. Even if a restaurant worker was diligent about saving money, the opportunities for investment would be limited to relatively small amounts of money and very few investment advisors would be interested in maintaining such a small account. Additionally, many workers accrue credit card and other debts that may charge significant interest. Without a savings strategy, it is difficult to retire this debt.

Many workers also have difficulty in saving to meet their tax liability. In areas where employees receive a significant amount of income through gratuities, saving is particularly difficult, since much of the worker's income is received in cash for each shift they work and, hence, is never deposited in a bank. For many years, it has been suspected that cash tips are under-reported—i.e., that some employees do not report the full amount of cash tips, which are not documented by the employer. Recently, it was ruled that the employer can be liable for taxes on estimated under-reported income. For example, if the Internal Revenue Service estimates that cash tips for a restaurant should be 14%, and the restaurant has reported less than that for its employees, then the restaurant is liable for the taxes on the difference.

Accordingly, a need has arisen for an investment system that accommodates the transitory and low wage workers. Further, a need has arisen for a cash reporting, collection, tracking and management investment system that withholds and reports a proper amount of income associated with gratuities.

BRIEF SUMMARY OF THE INVENTION

In a first aspect of the present invention, a system for saving income is provided including employer management circuitry for receiving information regarding gratuities for each participating employee of an employer, calculating settlement amounts for employees according to predefined withholding preferences and generating an investment database of investment amounts associated with the employees. Account manager circuitry receives the investment database and coordinates investment of the investment amounts in financial instruments.

The first aspect of the present invention provides several significant benefits, particularly for transitory or low-wage employees. From the standpoint of the employee, relatively small amounts of money can be withheld from gratuities/commissions for saving. The savings can follow the employee to each new employer without penalty. While the accounts for these employees may be small in the initial stages, the ability to continue the account after a job change allows the accounts to grow to significant values. The employee can design a withholding plan as a fixed amount, percentage of wages/gratuities/commissions, a percentage of sales, or a combination of factors. The money can be directed to different mutual funds, money market accounts, savings or checking accounts, debit accounts, credit card accounts, prepaid credit card accounts, loans/lines of credit accounts, insurance accounts, school loan accounts, debt consolidation accounts, or other banking or insurance instruments, or split between multiple accounts.

In a second aspect of the invention, a tax information system comprises processing circuitry for receiving information regarding credit/debit card sales gratuities for participating employees of an employer, receiving information on cash sales for the participating employees, determining a minimum amount of cash gratuities for the participating employees, receiving information on actual cash gratuities for each of the participating employees, and calculating taxes associated with the participating employees according to the credit/debit card gratuities, actual cash sales, minimum amount of cash gratuities, and actual cash gratuities.

The second aspect of the invention provides the advantages of accurate gratuity reporting and protection of liability to employers for underreported gratuity income by employees. Further, taxes can be withheld from employees at time of settlement in order to prevent unexpected tax liabilities for employees when taxes are due.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which:

FIG. 2b illustrates a screen-shot of data entered for calculating savings withholding;

DETAILED DESCRIPTION OF THE INVENTION

The present invention is best understood in relation to FIGS. 1-5 of the drawings, like numerals being used for like elements of the various drawings.

Figure 1:
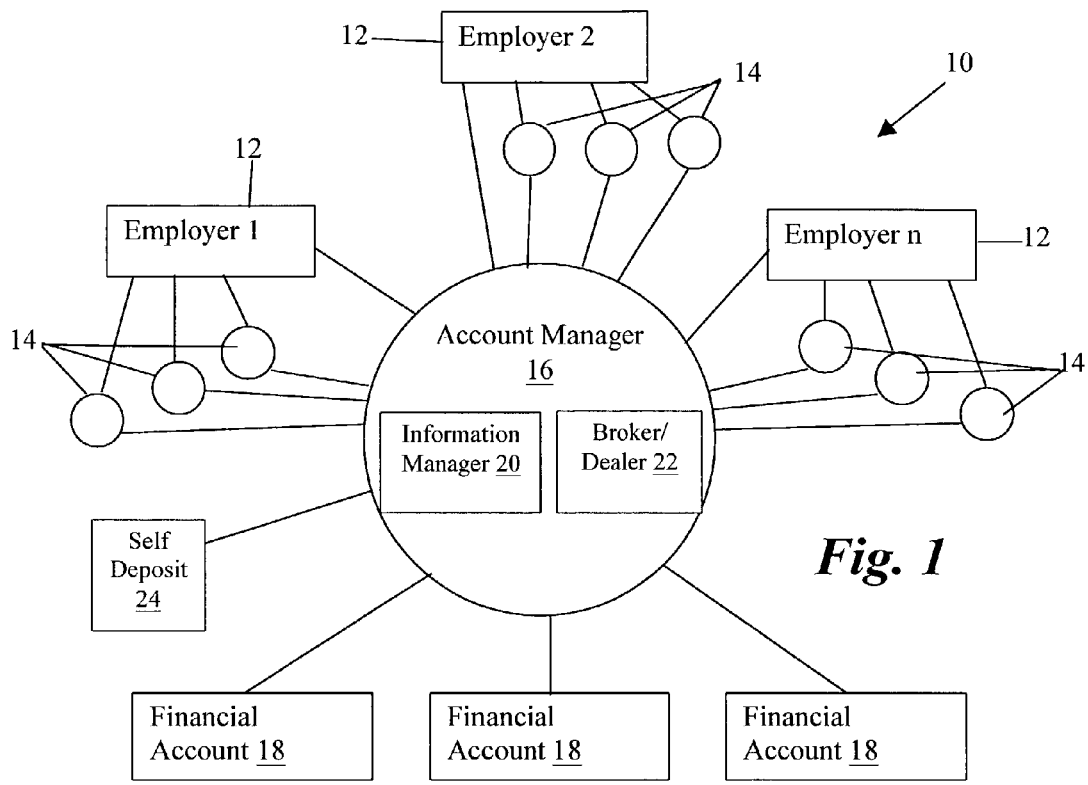
FIG. 1 illustrates a block diagram of an investment system.

FIG. 1 illustrates an overall functional block diagram of a preferred embodiment of a system 10 that easily accommodates the types of workers who are most likely to have problems allocating their income properly, with a minimal burden on the employers. Employers 12 provide their employees 14 with the opportunity to save a portion of their earnings, as described in detail below, in one or more third party investments. Employers may also require that each employee sign up for tax withholding and reporting. An Account Manager 16 coordinates database management and monetary transfers between the employer 12 (or the employer's financial institution) and one or more Financial Accounts 18 chosen by the employee. The Account Manager 16 includes an Information Manager 20 to maintain financial and demographic information on all participating employees and a Broker/Dealer 22 for managing money transfers for investments. Optionally, an employee can also direct money to a Financial Account 18 via self-deposit terminals 24.

The Information Manager 20 may be implemented on an SQL (or other) database server with an Internet connection. Similarly, the functions of the Broker/Dealer 22 may be implemented on a SQL database server. The functions of the Account Manager 16 could be provided by two separate entities, i.e., a separate Information Manager 20 and Broker/Dealer 22, or by a single entity that performs both functions. Further, the Information Manager and/or Broker/Dealer functions could be integrated into the operations of a financial institution associated with Financial Accounts 18. For purposes of illustration, it will be assumed that the Information Manager 20 and Broker/Dealer 22 are separate entities apart from the Financial Accounts 18.

Each employee is given a unique account number. The account number belongs to the employee 14, not the employer 12, and the account can be transferred by the employee from one employer 12 to another employer. The employee can, in the preferred embodiment, manage account details either through his or her employer or through a connection directly to the Account Manager 16, such as an Internet connection or a touch-tone phone, or through the Financial Account 18. In one embodiment, each employee uses his or her social security number as the unique account number.

Figure 2A:
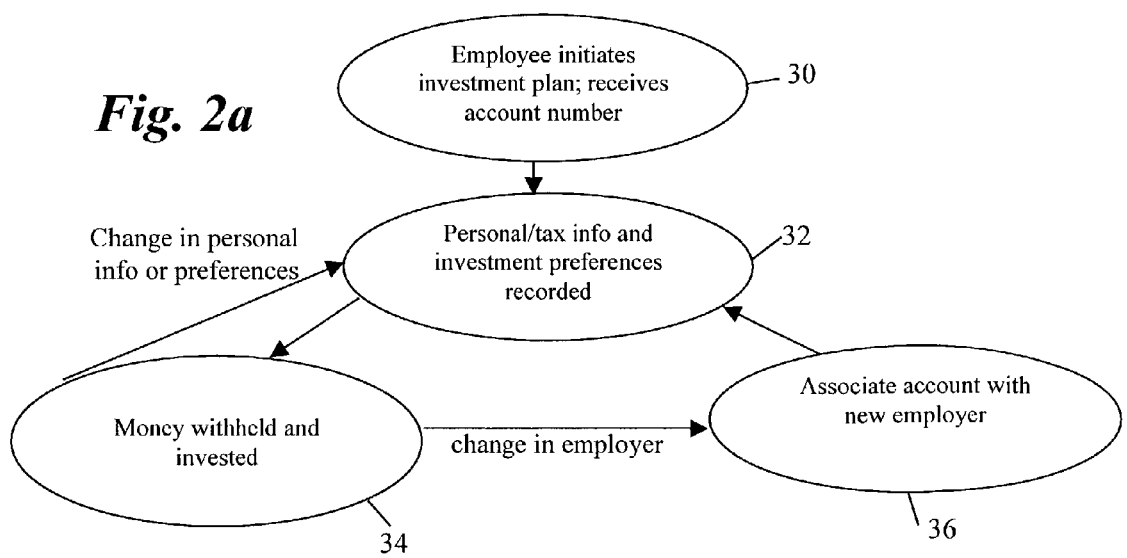
FIG. 2a illustrates a state diagram of the basic operation of the investment system of FIG. 1.

FIG. 2a shows a state diagram that outlines the basic operation of the system 10. In state 30, an employee 14 initiates his or her account with an employer who is participating in the investment program. The employee is given an account number through the Account Manager 16. In state 32, personal information and investment preference information is recorded in the Information Manager 20. The personal information would include, for example, full legal name, address, phone numbers, and a password for accessing information regarding the account. The investment preferences define the manner in which money is withheld by the employer and how the money is invested by the Account Manager 16 on behalf of the employee. The withholding preferences could include, for example, a percentage of wages/tips/commissions received, a percentage of sales, a set amount, periodic financial goals or a combination of factors. The investing preferences could provide several investments into which the employee chooses to invest his or her money, such as different mutual funds, money market accounts, savings or checking accounts, debit accounts, credit card accounts, prepaid credit card accounts, loans/lines of credit accounts, insurance accounts, school loan accounts, debt consolidation accounts, or other banking or insurance instruments. The employee may choose to split the withheld money between several accounts. Alternatively, the employer could limit employee preferences for withholding and/or investing the withheld money to one or more options chosen by the employer. An example of withholding preferences entered for an employee is shown in FIG. 2b.

With regard to tax withholding and reporting, the employee would need to provide information to accurately withhold taxes from the employee's reported income, similar to the W4 form currently being used. The system would collect this data through an electronic interface utilizing tax tables and deduction protocols as defined by the Internal Revenue Service.

After the personal information and investment preferences are entered, money is automatically withheld on behalf of the employee in conformance with the employee's instructions in state 34. Changes to the personal information and/or the investment preferences are preferably made by the employee through the employer. Modified information is periodically sent from the employers 12 to the Account Manager 16 for archival storage. Alternatively, information could be modified and monitored through a direct data connection between the employee 14 and the Account Manager 16 (for example, through the Internet) or through a dedicated terminal, such as self-deposit terminal 24.

In the event that an employee changes jobs (to another employer 12 which offers the investment/tax plan), the account information is associated with the new employer in state 36. Changes to the investment preferences, if any, are then made in state 32. The employee maintains the same account number—the only difference is that the new employer 12 is now responsible for withholding the investment and tax money and forwarding the money to the Account Manager 16. It would also be possible for an employee 14 to have a single account that covered employment under two or more different employers.

Figure 3A:
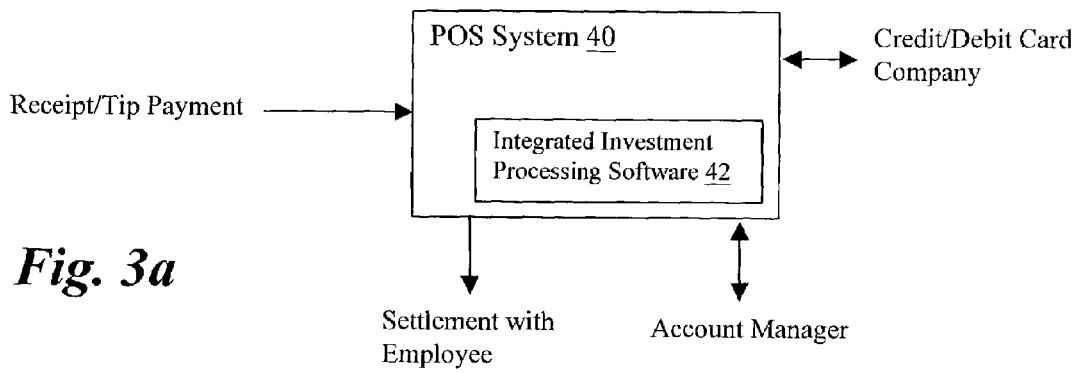
FIGS. 3a and 3b illustrate alternative embodiments of employer equipment for implementing the investment system.

FIG. 3a illustrates a first embodiment of the employer equipment for implementing the investment plan. In this embodiment, the software for administering the investment plan is executed in conjunction with a POS (point of sale) system 40 of the type typically used in restaurants, hotels or retail stores. For purposes of illustration, the POS system shown in FIG. 3a shows information flows that would be typical of a restaurant POS. The POS system 40 receives receipt and tip information throughout a worker's shift. For each waiter, the POS system 40 keeps track of each bill associated with a waiter's table and each payment received, along with tip amounts. At the end of a shift, the waiter will be owed money if credit/debit card tips and wages exceed the amount of outstanding cash sales or will owe money if outstanding cash sales exceed credit/debit card tip and wages. The POS will have an exact accounting for cash sales, credit/debit card sales and credit/debit card gratuities. If the employer is using the tax reporting/withholding aspects of the system, the employee will need to disclose the amount of cash gratuities received during the shift. The POS system 40 also communicates with one or more financial institutions for credit/debit card payments associated with the customer bills. This functionality is available from present day POS systems.

In the embodiment of FIG. 3a, the POS system 40 includes integrated investment processing software 42. This software provides several functions. First, it maintains the personal information and investment preferences described above. Second, the investment processing software 42 computes the investment withholding for each employee in accordance with the employee's preferences and the tax withholding in accordance with the employees tax deduction information (W4). This calculation can also compute the employer's liability for social security, Medicare and other taxes. Local, state and federal taxes can all be supported. Third, the system computes the settlement, accounting for the employee's investment and tax withholding. Fourth, it communicates with the Account Manager 16.

Figure 3B:
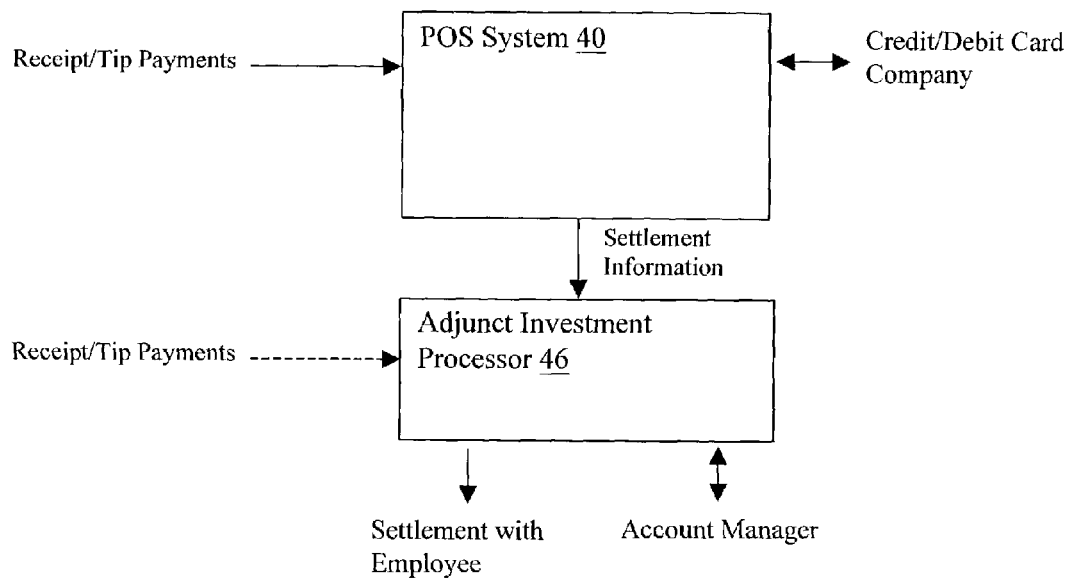

FIG. 3b illustrates an alternate embodiment of the employer equipment, where the POS system 40 is separate from the investment processing system 46. Typically, the investment processing system 46 is implemented on a personal computer. In this embodiment, the POS system 40 provides the typical settlement information for an employee, i.e., a settlement statement without any investment withholding. This information is passed to the investment processing system 46, either manually (by entering each employee's settlement information along with wage and tip information for computing the withholding) or automatically. The investment processing system 46 computes the investment and/or tax withholding according to the employee preferences and re-computes the settlement in view of the withholding. The investment processing system 46 also performs the communication with the Account Manager 16.

In the preferred embodiment, the employment investment software 42 or employment investment system 46 stores a minimal amount of data for each employee, with the Information Manager 20 of the Account Manager 16 maintaining a database of more detailed information. The employment investment software 42 or employment investment system 46 need only store the preference and deduction information for computing the investment and tax withholdings and simple personal information for each employee. Other data for each employee, such as social security number, address, investment preferences, historical account information, and so on, can be stored in the Information Manager 20 and downloaded to the employment investment software 42 or employment investment system 46 as necessary.

The functionality of the POS system 40 could be a dedicated processing device located at the business location or it could be a centralized system, accessible through a wide area network (WAN), global network (such as the Internet), or other communication link.

Figure 3C:
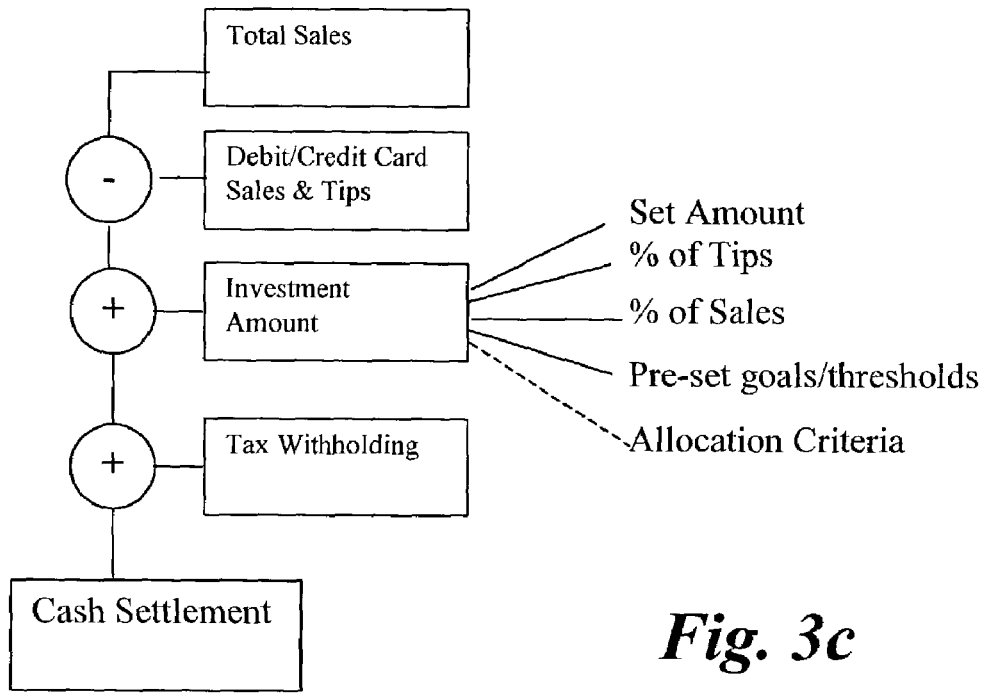
FIG. 3c illustrates the steps in calculating an employee settlement.

FIG. 3c illustrates how a settlement is performed using the integrated investment processing software 42 in connection with a POS system 40 or using the adjunct investment processor in connection with a POS system 40. The POS system 40 maintains an account of all sales during an employee's shift, whether debit/credit card or cash. The POS system also knows the amount of credit/debit tips the employee has received. Typically, during the day, the employee will keep all cash receipts for sales and tips. Accordingly, at the end of a shift, the employee will owe the restaurant a sum equal to the total sales, less the amount of debit/credit sales and tips, plus the amount of the employee's investment and tax withholding. If the employee had mostly credit card sales and tips, the restaurant may owe the employee at the time of the settlement.

The amount of the employee's investment for a shift may be derived by (1) fixed investment (for example, $10 per shift), (2) a percentage of the tips received, or (3) a percentage of the sales, or (4) a combination of factors (for example, $10 plus 2% of sales). In situations where a significant portion of the employee's tips are cash, the employee would need to report the amount of cash tips in order to calculate a percentage of tips.

Other conditions can also be used to determine the investment amount, such as pre-set goals and thresholds relating to financial performance. For example, the percentage factor used in calculating the amount to be withheld (or an allocation between Financial Accounts 18) may vary based on the employee's year-to-date, month-to-date or week-to-date income. Thus, in cases where income exceeds expectations, a higher percentage may be invested in long-term savings, whereas if income is below expectation, a lower percentage may be withheld. The formulas for withholding and allocation between Financial Accounts 18 could be made as simple or as complex as desirable.

Allocation between Financial Accounts for an individual worker could be made either at the employer's site, or at the Account Manager 16. One of the Financial Accounts 18 could be used to escrow the withheld taxes for all employees. This account would be debited periodically for estimated tax payments. Such monies could also be withheld by the system and periodically remitted to the Internal Revenue Service in concert with the employer's payroll system.

Due to repercussions to the employer for under-reporting of tip income, the employer may wish to provide thresholds for reported cash tips in order to protect itself against under-reporting penalties. One threshold would be to have a minimum reporting amount as a fixed percentage of cash sales. This fixed percentage could be applied to each shift's sales, or it could be applied to year-to-date sales, which would ameliorate spurious occurrences of below-threshold tips. In a second alternative, the threshold could apply to a fixed percentage of credit card and cash sales, either on a daily basis or a year-to-date basis. In a third alternative, the percentage for cash sales would need to be within a threshold of the actual tips on credit card sales. Thus, if an employee had tips averaging 18% on credit card sales, he could claim no less than 15% on cash sales, if a 3% threshold was used. Once again, this could be applied on a daily or year-to-date basis. In a fourth alternative which embodies automated self-reporting, the system could also be programmed to determine a specific tax liability that is determined by or in conjunction with the IRS to automatically enter a predetermined percentage of cash sales as the employees default taxable wage derived from cash sales. Thus if the IRS determined that if an employee incurred tax liability on 10% of their total cash sales as wages (in addition to actual credit card tips), then the system would automatically insert the tip declaration as 10% of cash sales. This number would be added to the defined amount of credit card tips.

Figure 4A:
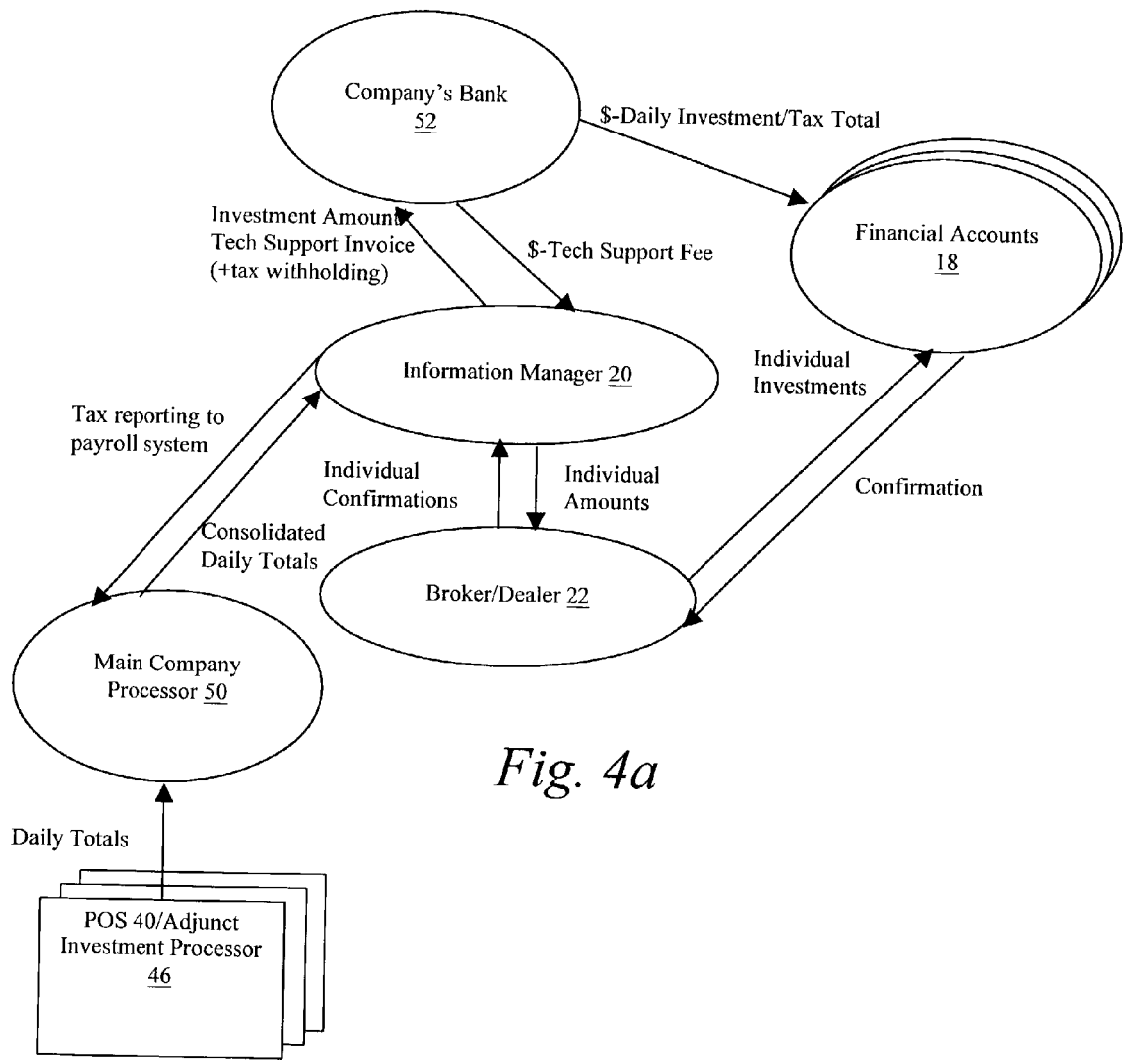
FIGS. 4a and 4b illustrate diagrams of cash flows in the investment system.
Figure 4B:
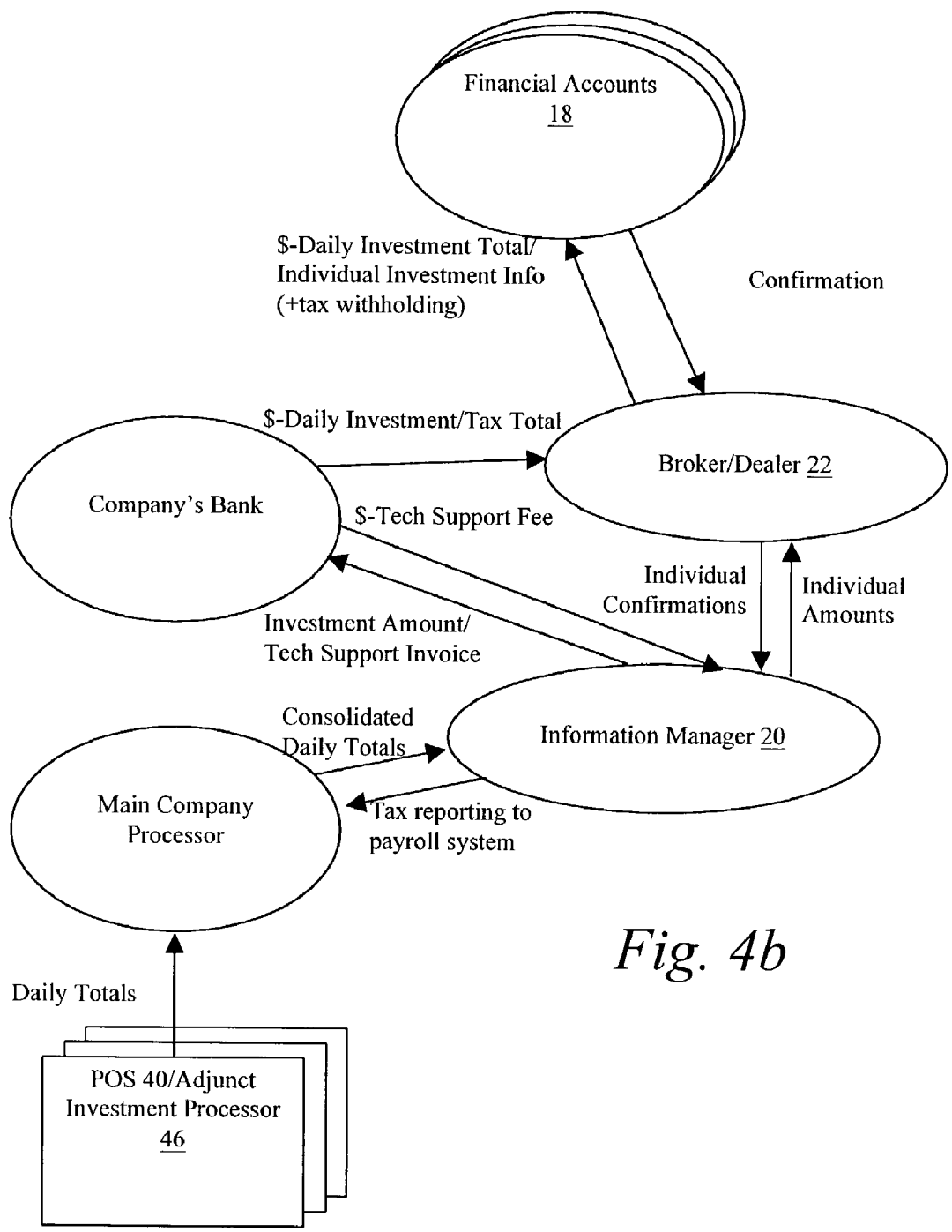

FIGS. 4a and 4b illustrates monetary and information flows in the system 10, using the example of a restaurant chain (the "Company"). FIG. 4a illustrates a first embodiment where the Broker/Dealer 22 manages the transfer of money, but does not actually hold the money. In this embodiment, the POS 40 or Adjunct Investment Processor 42 for each restaurant uploads gratuity information (along with the other sales information that is normally reported) to the main company processor 50, typically after the store closing each night. If the POS 40 and/or the Adjunct Investment Processor 42 are located remotely from the physical location of the restaurant, either to a designated company site or to a third party system over a communications link, this step is performed as the data is entered. The information from each restaurant is consolidated into a single database structure (the "Consolidated Daily Total"), specifying the amount of investment and taxes withheld the settlement for each employee. This information is uploaded to the Information Manager 20, typically through a secure electronic transfer protocol link through a telephone or Internet connection. Other information, such as changes in demographic information or investment preferences can also be uploaded at this time.

The Information Manager 20 processes information from the Consolidated Daily Total from the main company processor 50. The Information Manager 20 can determine a technical support fee, typically based on the number of transactions involved in the consolidated daily total. This amount is invoiced to the Company's Bank 52 and is kept by the entity providing the Information Manager service. The Information Manager 20 also determines a Daily Investment Total, which would be equal to the total amount invested in the Consolidated Daily Total, less the technical support fee, and sends the Daily Investment Total information to the Company's Bank 52 via a secure electronic transfer protocol connection. In addition, the Information Manager 20 sends a report to the Broker/Dealer 22 via a secure electronic transfer protocol connection indicating the amount (and allocation) of investment for each employee listed in the Consolidated Daily Total. The investment amount for each employee will be reduced by the technical support fee for that transaction.

In response to receiving the Investment Amount/Technical Support Fee from the Information Manager 20, the Company's Bank 52 sends an amount equal to the Technical Support Fee to the Information Manager and an amount equal to the Daily Investment Total to the Financial Account 18 using a financial data transfer system such as EDI (electronic data protocol) or ACH (automatic clearinghouse) protocol. The Broker/Dealer 22 sends information to the financial institutions associated with the various Financial Accounts 18, using a secure electronic transfer protocol, that specifies how the Daily Investment Total received from the Company's Bank 52 should be allocated between employee accounts, and how the money in the individual accounts should be invested.

After the financial institutions have invested the money in accordance with the Individual Investment information from the Broker/Dealer 22 (and escrowed the tax payments), the institutions send three reports to the Broker/Dealer 22 via a secure electronic transfer protocol connection: (1) a confirmation of the money received from the Company's Bank 52, (2) a confirmation of the money invested for each account and (3) a daily position log, which specifies the current position of each employee, whether or not the employee made a investment on that day. The Broker/Dealer forwards the confirmations to the Information Manager 20, which sends e-mail to each employee who made an investment on that day, specifying the amount and investment type. The employees can also access investment information from the Account Manager 20 electronically using a Web Browser or bulletin board connection. Further, tax withholding information can be sent to the employer's payroll system.

FIG. 4b operates similarly to FIG. 4a, except that the Broker/Dealer 22 is involved in the transfer of money. In FIG. 4b, as in FIG. 4a, the POS 40 or Adjunct Investment Processor 42 for each restaurant uploads gratuity information and other sales information to the main company processor 50. The Consolidated Daily Total is generated by the main company processor 50, listing information that specifies the amount of investment withheld from gratuities for each employee. This information is uploaded to the Information Manager 20, typically through a telephone or Internet connection, along with any changes to the employee profiles.

The Information Manager 20 processes information from the Consolidated Daily Total from the main company processor 50. The Information Manager 20 calculates the Technical Support Fee and invoices to the Company's Bank 52. The Information Manager 20 also calculates the Daily Investment Total and sends that information to the Company's Bank 52. In addition, the Information Manager 20 sends a report to the Broker/Dealer 22 indicating the amount of investment for each employee listed in the Consolidated Daily Total. The investment amount for each employee will be reduced by the technical support fee for that transaction.

In response to receiving the Investment Amount/Technical Support Fee from the Information Manager 20, the Company's Bank 52 sends an amount equal to the Technical Support Fee to the Information Manager 20 and sends an amount equal to the Daily Investment Total to the Broker/Dealer 22. The Broker/Dealer 22 transfers the money from the Company's Bank 52 to the financial institutions associated with the various Financial Accounts 18 and sends information to the institutions specifying how the Daily Investment Total received from the Company's Bank 52 should be allocated between employee accounts, and how the money in the individual accounts should be invested. In one embodiment, the Broker/Dealer 22 may hold money in a holding account until a threshold is met; once the threshold is met, then the money is transferred to the individual's Financial Account(s) 18.

After the financial institutions have invested the money in accordance with the Individual Investment information from the Broker/Dealer 22, the institutions send the confirmations and daily position log to the Broker/Dealer 22. The Broker/Dealer 22 forwards the confirmation to the Information Manager 20, which sends e-mail to each employee who invested that day. The employees can access information from the Account Manager 20 electronically using a Web Browser or bulletin board connection.

As stated above, the information manager 20 can generate support fees. In addition, the information manager 20 may charge a licensing fee from the restaurant and may receive a marketing fee from the financial institutions. The Broker/Dealer 22 may receive a fee on the total amount of investment assets and may receive a commission or finder's fee from the financial institutions.

Figure 5:
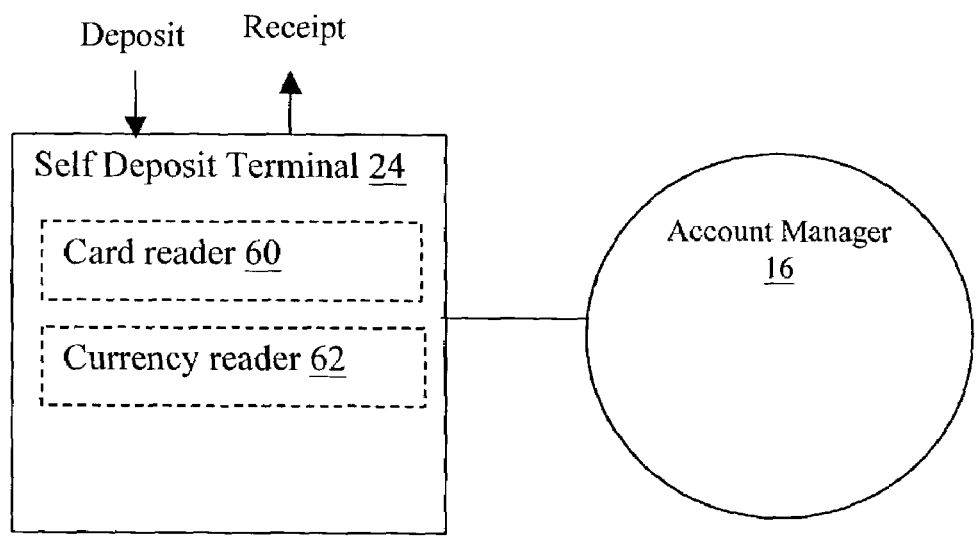
FIG. 5 illustrates a self-deposit terminal for discretionary investments.

FIG. 5 illustrates a block diagram of a self-deposit terminal 24 which may also be used in connection with the Account Manager 16 for providing a convenient way for participants to add money to their investment accounts. The self-deposit terminal 24 has an account reader 60 for reading a participant's account information card, in which account information is encoded using, for example, a magnetic strip or a semiconductor memory. Other identification, such as a PIN (personal identification number), voice sample, or fingerprint, could also be required. A currency reader 62, similar to those used in vending machines, would verify the amount of cash inserted into the self-deposit terminal 24. This amount would be credited to the participant's account. Self-deposit terminals 24 could also allow an employee to monitor account information, such as account balances, and to modify investment preferences.

It is envisioned that self-deposit terminals 24 could be available in easily accessible locations, such as convenience stores, to allow participants to add to their accounts. The self-deposit terminals 24 could be slightly modified ATM (automatic teller machines), which are already available in many locations. Participants may use the machines to add discretionary amounts to their accounts—either in addition to the withholding or in lieu of a withholding. Additionally, a participant who was not employed by an employer on the system could use the self-deposit terminals 24 to interact with the Account Manager.

As an alternative, the self-deposit terminals 24 could be administered by store personnel, who would receive the money and credit the account, similar to money order purchases. This would allow a human to verify the deposit before crediting an account.

In addition to workers who receive a portion of their money through tips/commissions, the investment system could be used in any situation where automatic payroll deduction was available, whether or not gratuities are part of the workers income. In particular, hourly and/or salaried employees, such as salespeople, clerks, mechanics, clerical and administrative staff, technicians, taxi and bus drivers, to name a few, would gain access to investment possibilities using the system described herein.

The present invention provides several significant benefits. From the standpoint of the employee, relatively small amounts of money can be withheld for saving and investing into individual accounts. Additionally, the withholding could be combined with the withholding from other employees to create a fund that can be invested in investment vehicles which would be otherwise unavailable. The accounts are portable between participating employers; therefore, investments follow the employee to each new employer without penalty. The employee can design a withholding plan as a percentage of wages and/or gratuities/commissions or a fixed amount, or a combination of both, which is painless in the short term, but will provide significant savings in the long term.

From the standpoint of the employer, a program can be offered to employees as a benefit at a minimal cost to the employer. This will help attract and retain employees. Additionally, this revolutionary new benefit is flexible and can be combined with incentive plans provided by the account manager and/or employer. Administration of the investment plan can be combined with existing POS systems for little or no extra effort. Further, a monetary incentive can be provided by the Account Manager to the employer, which may be used to offset the cost of implementing the investment plan, or may be used to reward employees.

While the present invention has been discussed largely in connection with financial accounts associated with stocks and bonds, the Financial Accounts 18 could include any type of account in financial institutions such as a bank or savings associations, credit providers, or insurance providers. Thus, the employee contributions could be invested in any combination of stocks, bonds, money market accounts, interest bearing or non-interest bearing savings or checking accounts, mutual funds, credit/loan instruments, electronic debit accounts or insurance policies.

The present invention provides a great deal of flexibility to workers. In one example, an employee may wish to pay off a loan or a credit card balance over time using a portion of tips/commissions/salary. The employee could direct this portion to the loan/credit card account until the balance was paid off. Similarly, a portion of tips/commissions could be directed to a debit card account or checking account.

Formulas for allocating income may be more complex to meet a worker's goals. A worker may wish to direct a portion of his income towards a monthly installment on an automobile loan; if the worker has a high income in a given month and installment is paid in full prior to the end of a month, the excess amount may be allocated between a stock account and a checking account.

The tax functions of the preferred embodiment provide significant advantages to employers and employees. The system can facilitate compliance with Internal Revenue Service requirements for employers to avoid penalties and can provide a simple method of deducting expected tax liabilities from the employee's settlement. Tax reporting to the payroll systems can be configurable for any range of time reporting options (weekly, bimonthly or monthly) and can be output in a variety of formats. The output data can include gross estimated tip wages and other tax information. The tax tables used in the calculations can support both federal and state taxes and can be updated as necessary.

Further, the functionality overall structure shown in FIGS. 4a and 4b could be modified in several ways. For example, if a financial institution controlled the Broker/Dealer 22 and/or the Information Manager 20, it could consolidate their functions with its own investment functions. Further, the POS 18 could be combined with either the Broker/Dealer 22 or Information Manager 20, or both. In one such scenario, the POS 18 would be available to companies of an Internet connection (or other communications link), whereby it could consolidate information from multiple physical locations.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. A tax information system comprising:
   processing circuitry for:
   receiving information regarding credit and debit card sales and gratuities for participating employees of an employer;
   receiving information on cash sales for said participating employees;
   determining a minimum amount of cash gratuities for said participating employees;
   receiving information on actual cash gratuities for each of said participating employees; and
   calculating payroll taxes for said participating employees according to said credit and debit card gratuities, actual cash sales, minimum amount of cash gratuities, and actual cash gratuities.

2. The system of claim 1 wherein said processing circuitry further includes circuitry for generating a settlement for each participating employee according to the credit/debit card gratuities, cash sales, and payroll taxes.

3. The system of claim 2 and further comprising account manager circuitry for coordinating the escrow of said payroll taxes.

4. The system of claim 3 wherein said account manager coordinates the investment of said payroll taxes.

5. The system of claim 1 wherein said determining of a minimum amount of cash gratuities is executed by said employer management circuitry by applying a fixed percentage to said cash sales.

6. The system of claim 1 wherein said determining of a minimum amount of cash gratuities is executed by said employer management circuitry by determining a percentage for cash sales responsive to the amount of credit and debit card gratuities and the amount of credit and debit card sales.

7. A method of providing tax information system comprising:
   receiving information in a processor regarding credit and debit card sales gratuities for participating employees of an employer;

receiving information in said processor on cash sales for said participating employees;

determining in said processor a minimum amount of cash gratuities for said participating employees;

receiving information in said processor on actual cash gratuities for each of said participating employees; and calculating in said processor taxes associated with said participating employees according to said credit and debit card gratuities, actual cash sales, minimum amount of cash gratuities, and actual cash gratuities.

8. The method of claim 7 and further including the step of generating a settlement for each participating employee according to the credit and debit card gratuities, cash sales, and taxes.

9. The method of claim 8 and further comprising the step of coordinating the escrow of said taxes.

10. The method of claim 9 wherein said coordinating step comprises the step of investing said taxes.

11. The method of claim 7 wherein said step of determining of a minimum amount of cash gratuities comprises the step of applying a fixed percentage to said cash sales.

12. The method of claim 7 wherein said step of determining of a minimum amount of cash gratuities comprises the step of applying a fixed percentage to said cash sales determining a percentage for cash sales responsive to the amount of credit and debit card gratuities and the amount of credit and debit card sales.

* * * * *